United States Patent [19]

Kayser

[11] 4,362,694

[45] Dec. 7, 1982

[54] LIQUID METAL-COOLED NUCLEAR REACTOR

[75] Inventor: Gaston Kayser, Aix en Provence, France

[73] Assignee: Commissariat a l'Energie Atomique, Paris, France

[21] Appl. No.: 167,703

[22] Filed: Jul. 11, 1980

[30] Foreign Application Priority Data

Jul. 17, 1979 [FR] France ............... 79 18452

[51] Int. Cl.³ ............................................. G21C 9/00
[52] U.S. Cl. .................... 376/298; 376/361; 376/373; 376/405; 376/403; 376/395; 376/399
[58] Field of Search ............... 376/298, 330, 361, 366, 376/373, 395, 400, 403, 405, 399

[56] References Cited

U.S. PATENT DOCUMENTS 3,401,082 9/1968 Ammon .............................. 376/405
4,056,439 11/1977 Robin ................................. 376/405
4,101,377 7/1978 Berniolles ........................ 376/405

Primary Examiner—Donald P. Walsh

[57] ABSTRACT

Integrated nuclear reactor cooled by a liquid metal and incorporating a main vessel sealed in its upper part by a slab, an inner vessel containing the core, the latter resting on a system for the positioning and supply of the core with liquid metal and which is called the support, the latter itself resting on a supporting structure bearing on the bottom of the main vessel of the reactor, wherein it comprises an inner baffle cladding the side wall and bottom of the main vessel and defining with the latter an intermediate space filled with the liquid metal, tubes for supplying a liquid metal to the intermediate space below the bottom of the main vessel and tubes for returning said liquid metal to an auxiliary exchanger in order to remove heat from the intermediate space.

6 Claims, 5 Drawing Figures

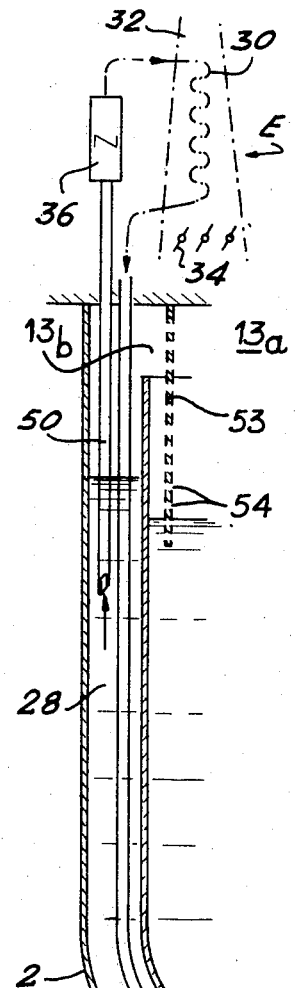
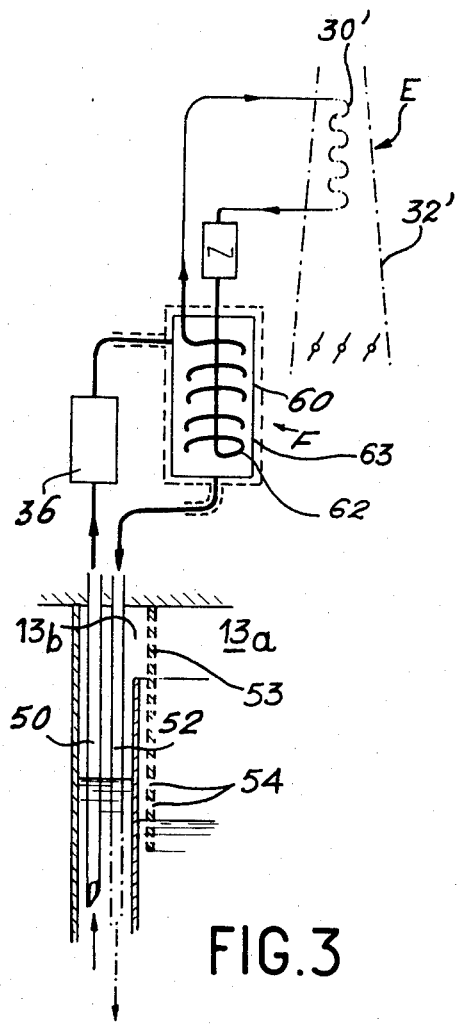
FIG. 2
FIG. 3

LIQUID METAL-COOLED NUCLEAR REACTOR

BACKGROUND OF THE INVENTION

The present invention relates to a liquid metal-cooled nuclear reactor, provided with a system for removing the residual power.

More specifically the invention relates to a novel system for removing the residual power in the case of a fast neutron reactor cooled by a liquid metal (generally liquid sodium), whereby said reactor is of the integrated type.

It is known that under normal operating conditions in liquid metal-cooled nuclear reactors the power given off by the fission reaction in the reactor core is absorbed by the so-called primary liquid metal circulation. The primary circuit is either located in the reactor vessel in the case of an integrated reactor or it passes out of the vessel in the case of a looped reactor. In most cases (and in all cases when the reactor is integrated) this liquid metal primary circuit is associated with a further liquid metal secondary circuit. This second circuit exchanges its heat with a water-vapour circuit which operates the turbines of the electrical power generation plant.

In addition to this systems for removing heat for supplying electric power reactors of this type comprise a cooling system, called the residual power removal system.

In the case of the French Superphenix reactor (liquid sodium-cooled integrated fast reactor) the residual power is removed in the following manner:

In the case of normal stoppages by starting-stopping circuits of the electricity generating system.

In the case of long stoppages or in the case of an electric power failure by sodium-air exchangers arranged in parallel on the liquid sodium secondary cooling circuits.

In the case where these normal residual power removal means do not exist all that remains are the following standby cooling means:

last resort cooling loops incorporating elongated generally cylindrical exchangers called "bottle" exchangers which are directly immersed in the liquid sodium of the primary vessel and are themselves connected to the sodium-air exchangers.

last resort cooling loops which are constituted by water circuits covering the shaft of the concrete-covered block in which is placed the main vessel and which receive the heat from the vessel by radiation.

It is added that in normal operation the wall of the main vessel is cooled by a tapped liquid sodium flow from the bases of the assemblies constituting the reactor. This flow then circulates in the annular space between the main reactor vessel and a thermal baffle cladding the main vessel.

The present invention relates to a system for removing the residual power from an integrated nuclear reactor cooled by a liquid metal which, on the one hand fulfils the functions normally fulfilled by such a system, but which also makes it possible to obtain the following advantages:

(a) the system according to the invention makes it possible to improve the cooling of the main vessel compared with the prior art cooling systems. If in particular the case is envisaged where the control rods do not drop it minimises the extraction of the latter from the core, said extraction being due to the differential heating of the main vessel compared with the control rod pins.

(b) The system according to the invention permits a better recovery of the molten fuel in the case of an accident leading to the at least partial fusion of the fuel material of the assemblies.

In a Superphenix reactor it is known that the assemblies are fitted by their bases into a support, which ensures both the positioning and the supply of the core with coolant. Between the support and the bottom of the main vessel there is a structure for recovering molten fuel in the case of an accident. In view of the melting temperature of the fuel (approximately 2,800° C. in the case of uranium oxide) and the high residual power which it gives off it is obviously very important to cool the molten metal in this recovery structure to obviate other accidents. However, in the case of last resort cooling systems comprising bottle exchangers located substantially above the core level, they are only able to ensure a mediocre cooling of the molten fuel material. Thus, the distance between these exchangers and the recovery zone is relatively large. Furthermore, tightly sealed structures separate the volume of the "cold" collector where the recovery means are located from the volume of the "hot" collector in which are immersed the bottle exchangers. Under these conditions the cooling, which is only as a result of natural convection in the liquid sodium and by conduction through the metal walls may be inadequate. However, with the system according to the invention a better cooling of the recovery zone is obtained.

BRIEF SUMMARY OF THE INVENTION

The present invention relates to an integrated nuclear reactor cooled by a liquid metal and incorporating a residual power removal system having all the advantages referred to hereinbefore.

The invention therefore relates to an integrated nuclear reactor cooled by a liquid metal and incorporating a main vessel sealed in its upper part by a slab, an inner vessel containing the core, the latter resting on a system for the positioning and supply of the core with liquid metal and which is called the support, the latter itself resting on a supporting structure bearing on the bottom of the main vessel of the reactor, wherein it comprises an inner baffle cladding the side wall and bottom of the main vessel and defining with the latter an intermediate space filled with the liquid metal, tubes for supplying a liquid metal to the intermediate space below the bottom of the main vessel and tubes for returning said liquid metal to an auxiliary exchanger in order to remove heat from the intermediate space.

According to a first embodiment the tubes which are used for supplying the liquid metal to the intermediate space are connected beneath the bottom of the main vessel to the tubes which return the liquid metal to the auxiliary exchanger, the latter being positioned externally of the reactor at a higher level than the slab and is provided with means for regulating the heat exchange efficiency, the baffle incorporating orifices which connect the intermediate space to the liquid metal contained in the main vessel.

According to a second embodiment the tubes for returning the liquid metal to the auxiliary exchanger are immersed in the latter and emerge in the vicinity of its upper part, the tubes for supplying the liquid metal to the intermediate space are immersed in the latter and emerge beneath the bottom of the main vessel, the auxiliary exchanger being connected to the tubes and positioned externally of the reactor at a higher level than the slab, said exchanger being provided with means for regulating the heat exchange efficiency.

According to a third embodiment the auxiliary exchanger is suspended on the slab and is immersed in the intermediate space, the auxiliary exchanger incorporating an envelope provided with intake ports located in the upper part of the intermediate space and a pump whose delivery pipe is fitted into a funnel-shaped end of each of the tubes supplying the liquid metal to the intermediate space, the open end of these tubes issuing into the lower region of the intermediate space.

BRIEF DESCRIPTION OF THE DRAWINGS

The invention is described in greater detail hereinafter relative to non-limitative embodiments and with reference to the attached drawings, wherein show:

FIG. 2—a vertical sectional view similar to that of FIG. 1 but showing a second embodiment of the residual power removal system.

FIG. 3—a partial view of a constructional variant of the residual power removal system shown in FIG. 2.

DETAILED DESCRIPTION OF THE PREFERRED EMBODIMENTS

The following description considers the case of nuclear reactors incorporating an inner cylindrical vessel. However, it is obvious that the invention also applies to integrated nuclear reactors cooled by a liquid metal in which the inner vessel is of the ridged type. The latter type of reactor is known (cf. particularly BIST No. 182 of June 1973), so that there is no need to describe it in detail. For the better understanding of the invention is merely necessary to point out that in such a reactor the inner vessel has a ridge which is sealingly traversed by the intermediate heat exchangers. The intake for the intermediate exchangers is positioned above the ridge and thus communicates with the outlet of the reactor core. The outlet of the intermediate exchanger is positioned below the ridge and thus communicates with the intake of the primary pumps.

Figure 1:
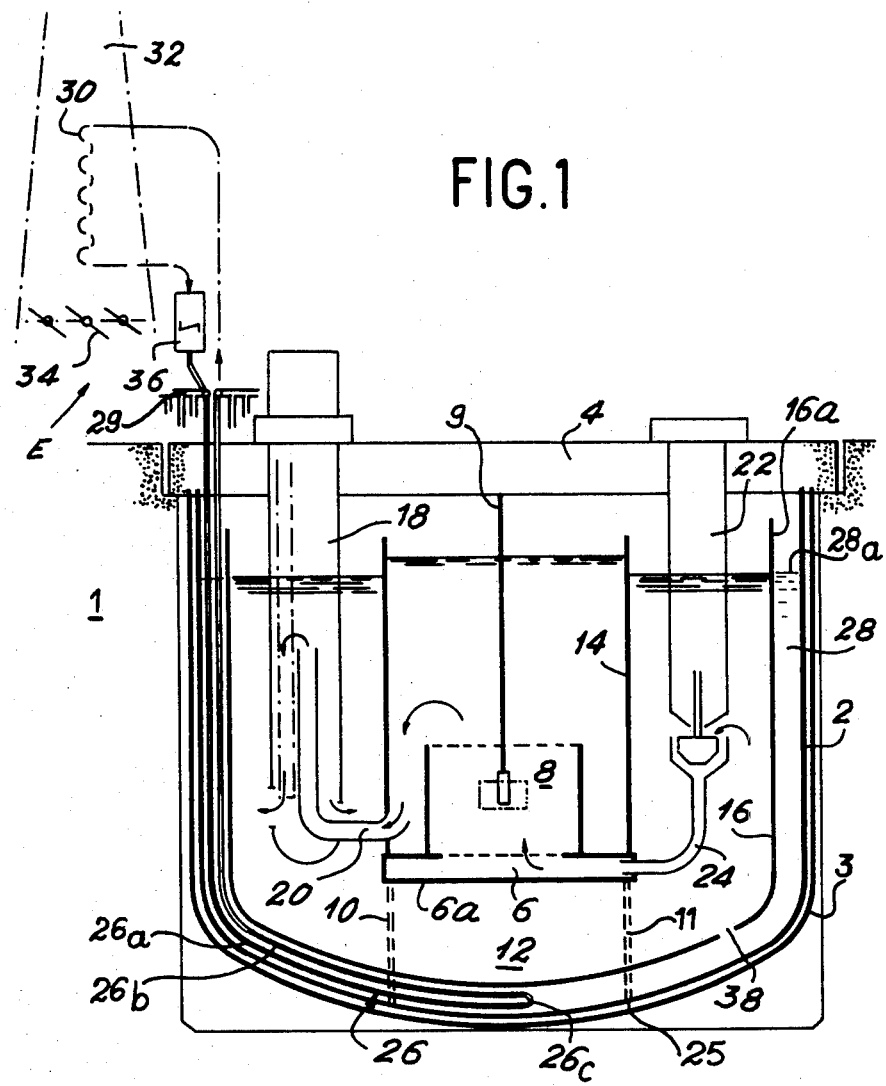
FIG. 1—a simplified vertical sectional view of an integrated nuclear reactor incorporating a first embodiment of the residual power removal system.

On referring to FIG. 1 it can be seen that in known manner within a concrete-covered block 1 the reactor has a main vessel 2 suspended on an upper sealing slab 4. This main vessel 2 is externally duplicated by a safety vessel 3, also suspended on the sealing slab 4. The main vessel 2 contains support 6 on which is positioned the reactor core 8. In conventional manner the reactor is controlled by a plurality of control rods 9 (a single rod is shown in order to not unnecessarily complicate the drawing), whose penetration within core 8 can be varied. Support 6 is supported by a base covering 10 resting on the bottom of vessel 2 by the perimeter of the circle 25. The molten fuel receiving means is located in zone 12. Core 8 is surrounded by an inner cylindrical vessel 14. The main vessel 2 contains a vessel 16 forming a baffle and which also covers the bottom of vessel 2, said baffle being free at its upper end 16a. Between baffle 16 and inner vessel 14 are provided several intermediate exchangers 18 suspended on slab 4 and connected by pipes 20 within the inner vessel 14. There are also primary pumps 22, which are also suspended on slab 4. The outlet from said pumps is connected by pipes 24 to support 6 for reinjecting cold liquid sodium. All these arrangements correspond to an integrated nuclear reactor cooled by a liquid metal in accordance with the prior art.

According to a first embodiment of the present invention the residual power removal system is constituted by a plurality of auxiliary heat exchangers E. Each exchanger E comprises a plurality of tubes 26 which are immersed in the intermediate space 28 made between vessel 2 and baffle 16. Each of the tubes 26 constitutes a closed circuit and has an outward branch 26a and a return branch 26b connected by a curving portion 26c. As a function of the tubes the latter can be positioned in an area close to the axis of the main vessel 2 (as shown in the drawing) or at a greater or lesser distance from said axis. The upper ends of tubes 26 traverse slab 4 and are connected by means of a collector 29 to an exchanger E constituted by an exchange group 30 located in a funnel 32, provided with air regulating flaps 34. Sodium is circulated in tubes 26 by means of an electromagnetic pump 36.

Moreover, the bottom of baffle 16 is provided with orifices 38, connecting the intermediate space 38 to the volume of the cold collector located between baffle 16 and inner vessel 14. These orifices 38 are calibrated in such a way as to reduce the variation speeds of the free level 28a of the intermediate space 28. Furthermore area 12 defined by the base covering 10 is not tightly sealed, as is the case in the prior art reactors, but instead communicates with the remainder of the vessel by means of openings 11 provided in covering 10.

The installation functions in the following way. Under normal operating conditions flaps 34 are closed, but pump 36 operates. Tubes 26 remove heat at the top of the main vessel 2 and return this heat to the bottom of the vessel, because the flaps are closed. Thus, the circuit ensures the cooling of the top of the main vessel 2 and it is no longer necessary to provide a large leakage flow in the assembly bases of the core for carrying out this cooling. This flow is approximately 3% of the flow rate of the primary pumps. This leakage flow which is generally also used for the hydraulic locking of the assembly bases can be limited to approximately 0.5% of the flow rate of the primary pumps. On wishing to remove the residual power flaps 34 are opened and exchangers E operate effectively. The residual power is absorbed through baffle 16. Moreover, the main vessel is better cooled than in the prior art solution (auxiliary bottle exchangers) and in all circumstances constitutes the coolest structure of the reactor.

An essential advantage provided by the invention is the maintaining of a sufficiently low temperature of structures having high constraints and an essential safety function, such as the regions of the main vessel located along circle 25. These regions which correspond to what is called the "triple point" must ensure the supporting of core 8, whilst maintaining the sealing of the main vessel 2.

The invention provides a further advantage in the case of an accident for which there has been no dropping of control rods ensuring the stoppage of the fission reaction. On opening flaps 34 the main vessel and baffle become decidedly cooler than the average liquid sodium temperature and in particular that of the sodium immersed in the control rods 9. Thus, the differential expansion corresponding to the difference between the expansion of the main vessel 2 and that of the control rods 9 is well below that in the conventional solution where said expansion leads to a significant extraction of the rods from the core. In the present arrangement this extraction is greatly reduced and as a result the neutron chain reaction is cancelled out by the thermal negative reaction for a sodium temperature called the "suffocating" temperature which is significantly lower, for example approximately 730° C. instead of 900° C.

A supplementary advantage is in the recovery of the molten fuel. Due to the fact that the base covering 10 is perforated, the lower plate 6a of the support is more easily cooled by natural convection and the latter can consequently hold back more debris before being perforated. Then if the molten fuel drops on to the bottom of baffle 16, the latter is very well cooled by tubes 26.

Finally there is a large number of exchange tubes 26 for each exchanger E. If one of these tubes leaks it is easy to seal it without significantly reducing the exchange surface.

FIG. 2 shows a second embodiment of the invention. According to this embodiment the auxiliary exchangers E are no longer associated with a plurality of sealed tubes and are instead associated with a plurality of pairs of open tubes, each pair comprising a tube 50 for sampling sodium in the upper region of space 28 and a sodium delivery tube 52 which issues into the bottom of space 28. These tubes 50 and 52 are connected to the exchange group associated with funnel 32 to form an air-sodium exchanger. In this embodiment baffle 16 has no orifices. The sodium contained in space 28 is therefore separated from the primary sodium and can at the most contain a few traces of activity resulting from a possible condensation of aerosols from the primary sodium. To minimise this it is advantageously possible to provide a supplementary baffle 53 located in the vicinity of baffle 16 and immersed in the primary sodium, said baffle 53 being suspended on slab 4. Baffle 53 is provided with orifices 54 for adjusting the pressures of the argon canopy in spaces 13a and 13b located on either side of baffle 53.

This solution has the advantage of being more reliable and more economic than that of the first embodiment, because it eliminates the sealed tubes 26 with their curved portion 26c. In addition the sodium or space 28 circulates directly in the exchange group 30, so that the thermal resistance is considerably reduced, which, for equal performances, makes it possible to use a smaller sodium-air exchange surface. Moreover, this solution minimises the disadvantage of the non-detachability of tubes 52, because a leak in one tube 52 is infinitely less probably and will in any case only have a very limited consequence.

FIG. 3 shows a first variant of the system shown in FIG. 2. According to this variant tubes 50 and 52 issue into the outer envelope 60 of an exchanger F, said envelope 60 being advantageously constituted by a double wall 63. This enclosure contains a coil 62 mounted in a sodium circuit having an exchange group 30' identical to the group 30 of FIGS. 1 and 2. There is also a funnel 32', identical to funnel 32.

Due to the presence of exchanger F the risk of leaks is considerably reduced, the risks being much lower in the case of cylindrical enclosure 60 than in the case of group 30. Moreover the existence of the double wall 63 substantially eliminates the risk of sodium being discharged outside enclosure 60.

Figure 4:
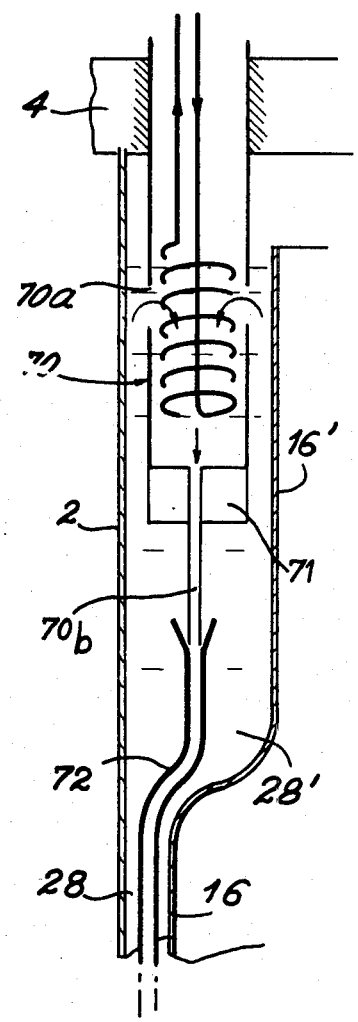
FIG. 4—a partial view showing a third embodiment of the invention.

FIG. 4 diagrammatically shows another solution according to which a bottle-type exchanger 70 is located in space 28 between main vessel 2 and baffle 16. The upper part 16' of the baffle has a detachment defining an enlarged intermediate space 28' which contains exchanger 70. The latter is suspended on slab 4 and has intake ports 70a. It is provided with an electromagnetic pump 71, whose discharge pipe 70b is fitted in the funnel-shaped end of a discharge tube 72, whose other end is extended to the bottom of space 28. The system constituted by exchanger 70 and pump 71 is thus made detachable.

Figure 5:
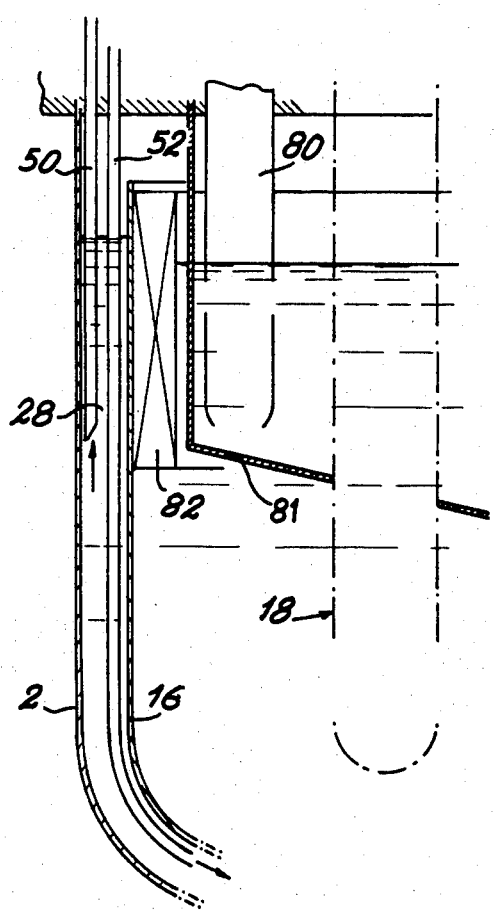
FIG. 5—a view showing the combination of a residual power removal system according to FIG. 2 with a prior art bottle exchanger.

FIG. 5 shows the combination of an auxiliary exchanger, like that shown in FIG. 2 and a conventional bottle exchanger 80 immersed in the primary sodium. This combination is particularly advantageous in the case of a reactor having an inner vessel provided with a ridge 81. Under normal operating conditions to minimise heat leaks through baffle 16 a thermal insulant 82 which passes all round baffle 16 can be provided in the upper part of the latter.

In this complete solution, when operating normally the cooling of vessel 2 is effected by the circulation of sodium in intermediate space 28, the flaps 34 being closed. In the case of an accident the bottle exchangers 80 extract most of the residual power, but due to the opening of flaps 34 the exchangers E maintain the temperature of the main vessel at a relatively low value.

What is claimed is:

1. A nuclear reactor cooled by a primary liquid metal and comprising: a main vessel having a bottom wall and a side wall, a slab sealing said main vessel, a core, an inner vessel within said main vessel and containing said core, a support for positioning and supplying said core with said primary liquid metal, a supporting structure bearing on said bottom wall and supporting said support, at least one main exchanger and at least one primary pump suspended from said slab, said reactor further comprising a baffle located in the main vessel and cladding said side wall and said bottom wall to define with said main vessel an intermediate space filled with said primary liquid metal, tubes located within said intermediate space for supplying from an auxiliary exchanger a cooling liquid metal to a part of said space defined between said baffle and said bottom wall of the reactor vessel, and tubes located within said intermediate space for returning said cooling liquid metal to said auxiliary exchanger, in order to remove heat from said intermediate space.

2. A nuclear reactor according to claim 1, wherein said tubes for supplying the cooling liquid metal are connected in said part of the intermediate space to said tubes for returning the cooling liquid metal to the auxiliary exchanger, the latter being positioned externally of the main vessel at a higher level than the slab and being provided with means for regulating the heat exchange efficiency, said baffle incorporating orifices.

3. A nuclear reactor according to claim 1, wherein said tubes for returning the cooling liquid metal to the auxiliary exchanger are immersed in the intermediate space and emerge in an upper part of the latter, said tubes for supplying the cooling liquid metal to the intermediate space being immersed in the latter and emerging in said part of the intermediate space defined between said baffle and the bottom of the main vessel, said auxiliary exchanger being connected to said tubes and positioned externally of the main vessel at a higher level than the slab, said auxiliary exchanger being provided with means for regulating the heat exchange efficiency.

4. A reactor according to claim 3, wherein said tubes issue into an intermediate exchanger, traversed by a secondary fluid which circulates in said auxiliary exchanger.

5. A reactor according to claim 1, wherein said auxiliary exchanger is suspended from said slab and is immersed in said intermediate space, said auxiliary exchanger incorporating an envelope provided with intake ports located in the upper part of the intermediate space, and a pump having a delivery pipe fitted into a funnel-shaped end of each of said tubes supplying the cooling liquid metal to the intermediate space, the other end of the latter tubes issuing into said part of the intermediate space defined between said baffle and the bottom wall of the main vessel.

6. A reactor according to claim 2, wherein said supporting structure is provided with orifices.

* * * * *